United States Patent
Karahoca

[19]
[11] Patent Number: 5,971,264
[45] Date of Patent: Oct. 26, 1999

[54] REUSABLE GIFT WRAPPING CONTAINER

[76] Inventor: Zehra R. Karahoca, 403 S. Berks St., Allentown, Pa. 18104

[21] Appl. No.: 09/130,439
[22] Filed: Aug. 6, 1998
[51] Int. Cl.[6] .................................................... B65D 65/38
[52] U.S. Cl. ...................................... 229/116.5; 229/87.19; 229/923
[58] Field of Search ................................ 229/116.5, 922, 229/923, 87.18, 87.19; 206/457

[56] References Cited

U.S. PATENT DOCUMENTS

| | | |
|---|---|---|
| Re. 26,742 | 12/1969 | Laskow . |
| 1,356,895 | 10/1920 | Wagoner ........................... 229/923 X |
| 2,822,970 | 2/1958 | Froggatt et al. ..................... 229/116.5 |
| 3,064,876 | 11/1962 | Wanver ............................ 229/87.19 X |
| 3,076,589 | 2/1963 | Meijdam ............................ 229/922 X |
| 3,355,092 | 11/1967 | Le Pain ................................. 229/87.19 |
| 3,434,645 | 3/1969 | Prisco ............................... 229/87.19 X |
| 5,004,144 | 4/1991 | Selga ................................... 229/87.19 |
| 5,065,935 | 11/1991 | Mancel ............................... 229/922 X |
| 5,245,815 | 9/1993 | Savage ............................ 229/87.19 X |
| 5,407,125 | 4/1995 | Yates et al. .......................... 229/87.19 |
| 5,414,976 | 5/1995 | Richards .......................... 229/87.19 X |
| 5,542,597 | 8/1996 | Richards ............................. 229/116.5 |
| 5,769,770 | 6/1998 | Savage ............................ 229/87.19 X |
| 5,904,289 | 5/1999 | Hagan ................................. 229/87.19 |

Primary Examiner—Bryon P. Gehman

[57] ABSTRACT

A new reusable gift wrapping container for providing an easier means of wrapping a gift. The inventive device includes a top portion including a rectangular central panel. The central panel has opposed long side edges and opposed short end edges. The opposed short end edges each have an end flap foldably secured thereto. The end flaps each have a generally rectangular configuration. The end flaps each have a supplemental end flap foldably secured to a free outer edge thereof. The opposed long side edges each have a top flap foldably secured thereto whereby inward folding of the top flaps will cover the bottom panel. The top flaps each have a generally trapezoidal configuration. Each top flap has a hook and loop strip disposed on a bottom surface for coupling with hook and loop fasteners of a central outer surface of the bottom portion. The bottom portion is provided having a generally rectangular configuration. The bottom portion is defined by a bottom panel having a pair of opposed end flaps and a pair of opposed side flaps extending therefrom.

8 Claims, 4 Drawing Sheets

REUSABLE GIFT WRAPPING CONTAINER

BACKGROUND OF THE INVENTION

1. Field of the Invention

The present invention relates to gift boxes and more particularly pertains to a new reusable gift wrapping container for providing an easier means of wrapping a gift.

2. Description of the Prior Art

The use of gift boxes is known in the prior art. More specifically, gift boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art gift boxes include U. S. Pat. No. 5,245,815 to Savage; U.S. Pat. No. 5,065,935 to Mancel; U.S. Pat. No. 5,251,759 to Gannon et al.; U.S. Pat. No. 4,784,314 to Penick; U.S. Pat. No. 4,858,822 to Johnson et al.; and U.S. Pat. No. Des. 332,218 to Serna.

While these devices fulfill their respective, particular objectives and requirements, the aforementioned patents do not disclose a new reusable gift wrapping container. The inventive device includes a top portion including a rectangular central panel. The central panel has opposed long side edges and opposed short end edges. The opposed short end edges each have an end flap foldably secured thereto. The end flaps each have a generally rectangular configuration. The end flaps each have a supplemental end flap foldably secured to a free outer edge thereof. The opposed long side edges each have a top flap foldably secured thereto whereby inward folding of the top flaps will cover the bottom panel. The top flaps each have a generally trapezoidal configuration. Each top flap has a hook and loop strip disposed on a bottom surface for coupling with hook and loop fasteners of a central outer surface of the bottom portion.

In these respects, the reusable gift wrapping container according to the present invention substantially departs from the conventional concepts and designs of the prior art, and in so doing provides an apparatus primarily developed for the purpose of providing an easier means of wrapping a gift.

SUMMARY OF THE INVENTION

In view of the foregoing disadvantages inherent in the known types of gift boxes now present in the prior art, the present invention provides a new reusable gift wrapping container construction wherein the same can be utilized for providing an easier means of wrapping a gift.

The general purpose of the present invention, which will be described subsequently in greater detail, is to provide a new reusable gift wrapping container apparatus and method which has many of the advantages of the gift boxes mentioned heretofore and many novel features that result in a new reusable gift wrapping container which is not anticipated, rendered obvious, suggested, or even implied by any of the prior art gift boxes, either alone or in any combination thereof.

To attain this, the present invention generally comprises a top portion including a rectangular central panel. The central panel has opposed long side edges and opposed short end edges. The opposed short end edges each have an end flap foldably secured thereto. The end flaps each have a generally rectangular configuration. The end flaps each have a supplemental end flap foldably secured to a free outer edge thereof. The opposed long side edges each have a top flap foldably secured thereto whereby inward folding of the top flaps will cover the bottom panel. The top flaps each have a generally trapezoidal configuration. Each top flap has a hook and loop strip disposed on a bottom surface for coupling with hook and loop fasteners of a central outer surface of the bottom portion. The bottom portion is provided having a generally rectangular configuration. The bottom portion is defined by a bottom panel having a pair of opposed end flaps and a pair of opposed side flaps extending therefrom.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new reusable gift wrapping container apparatus and method which has many of the advantages of the gift boxes mentioned heretofore and many novel features that result in a new reusable gift wrapping container which is not anticipated, rendered obvious, suggested, or even implied by any of the prior art gift boxes, either alone or in any combination thereof.

It is another object of the present invention to provide a new reusable gift wrapping container which may be easily and efficiently manufactured and marketed.

It is a further object of the present invention to provide a new reusable gift wrapping container which is of a durable and reliable construction.

An even further object of the present invention is to provide a new reusable gift wrapping container which is susceptible of a low cost of manufacture with regard to both materials and labor, and which accordingly is then susceptible of low prices of sale to the consuming public, thereby making such reusable gift wrapping container economically available to the buying public.

Still yet another object of the present invention is to provide a new reusable gift wrapping container which provides in the apparatuses and methods of the prior art some of the advantages thereof, while simultaneously overcoming some of the disadvantages normally associated therewith.

Still another object of the present invention is to provide a new reusable gift wrapping container for providing an easier means of wrapping a gift.

Yet another object of the present invention is to provide a new reusable gift wrapping container which includes a top portion including a rectangular central panel. The central panel has opposed long side edges and opposed short end edges. The opposed short end edges each have an end flap foldably secured thereto. The end flaps each have a generally rectangular configuration. The end flaps each have a supplemental end flap foldably secured to a free outer edge thereof. The opposed long side edges each have a top flap foldably secured thereto whereby inward folding of the top flaps will cover the bottom panel. The top flaps each have a generally trapezoidal configuration. Each top flap has a hook and loop strip disposed on a bottom surface for coupling with hook and loop fasteners of a central outer surface of the bottom portion. The bottom portion is provided having a generally rectangular configuration. The bottom portion is defined by a bottom panel having a pair of opposed end flaps and a pair of opposed side flaps extending therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
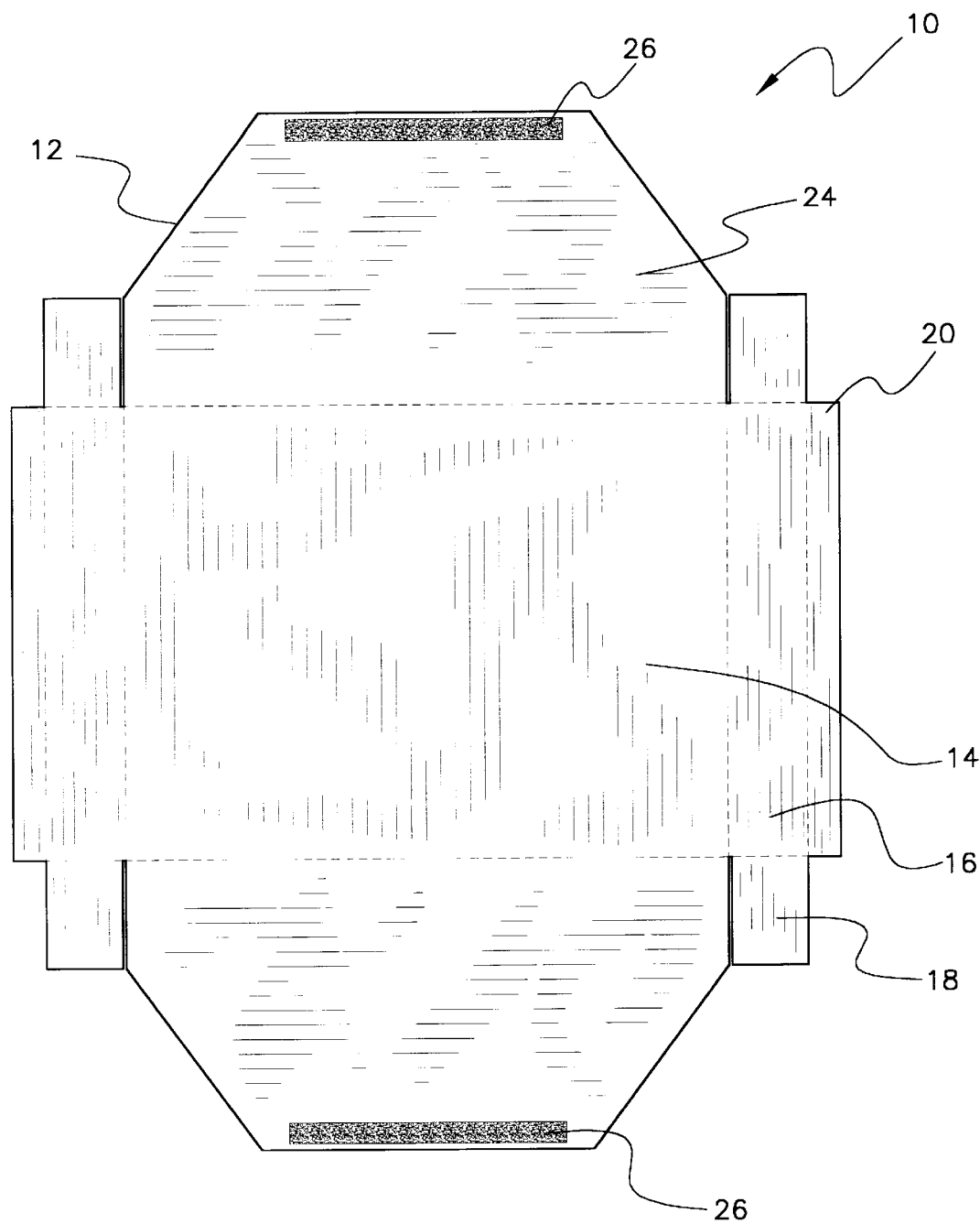
FIG. 1 is a bottom plan view of the top portion of a new reusable gift wrapping container according to the present invention.
Figure 2:
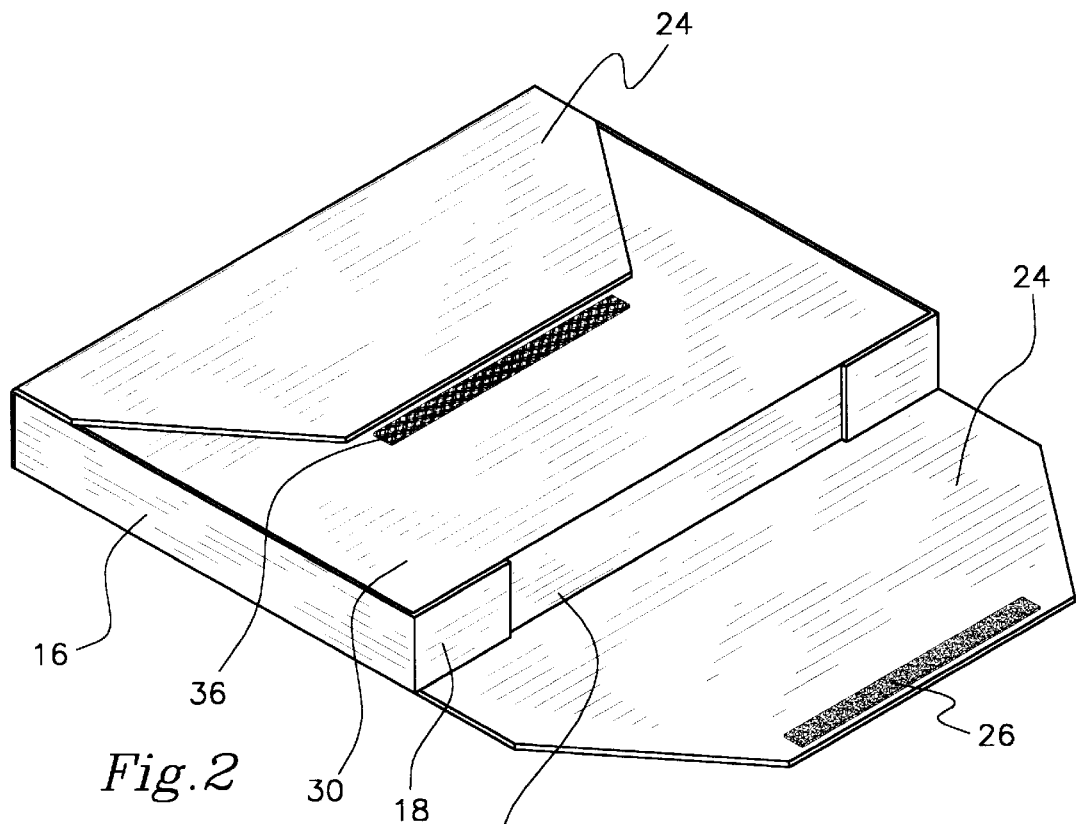
FIG. 2 is a perspective view of the top portion of the present invention in place on the bottom portion thereof.
Figure 3:
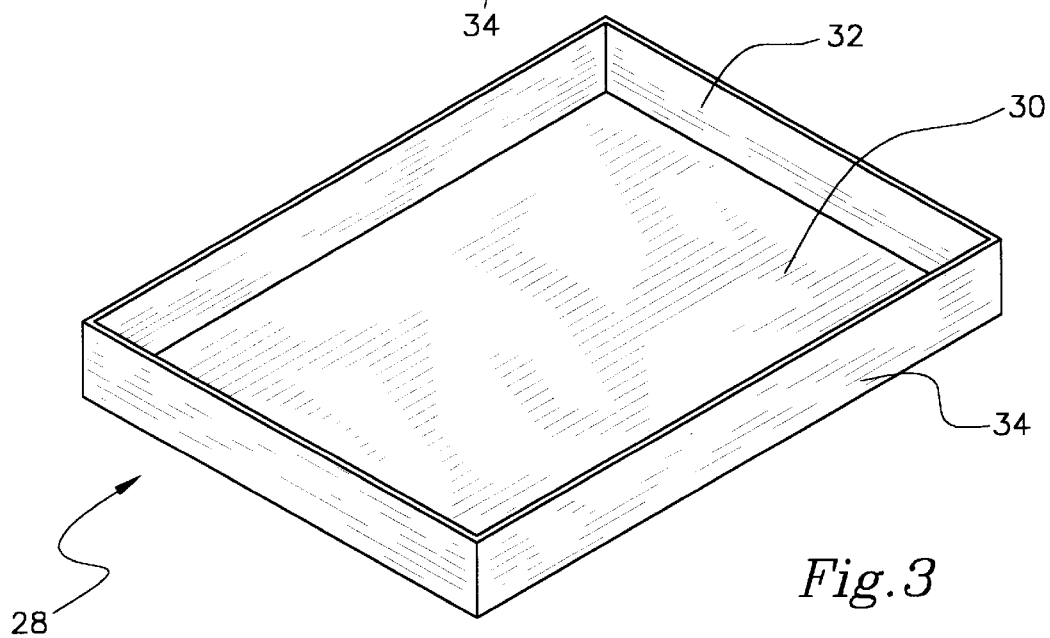
FIG. 3 is a perspective view of the bottom portion of the present invention.
Figure 4:
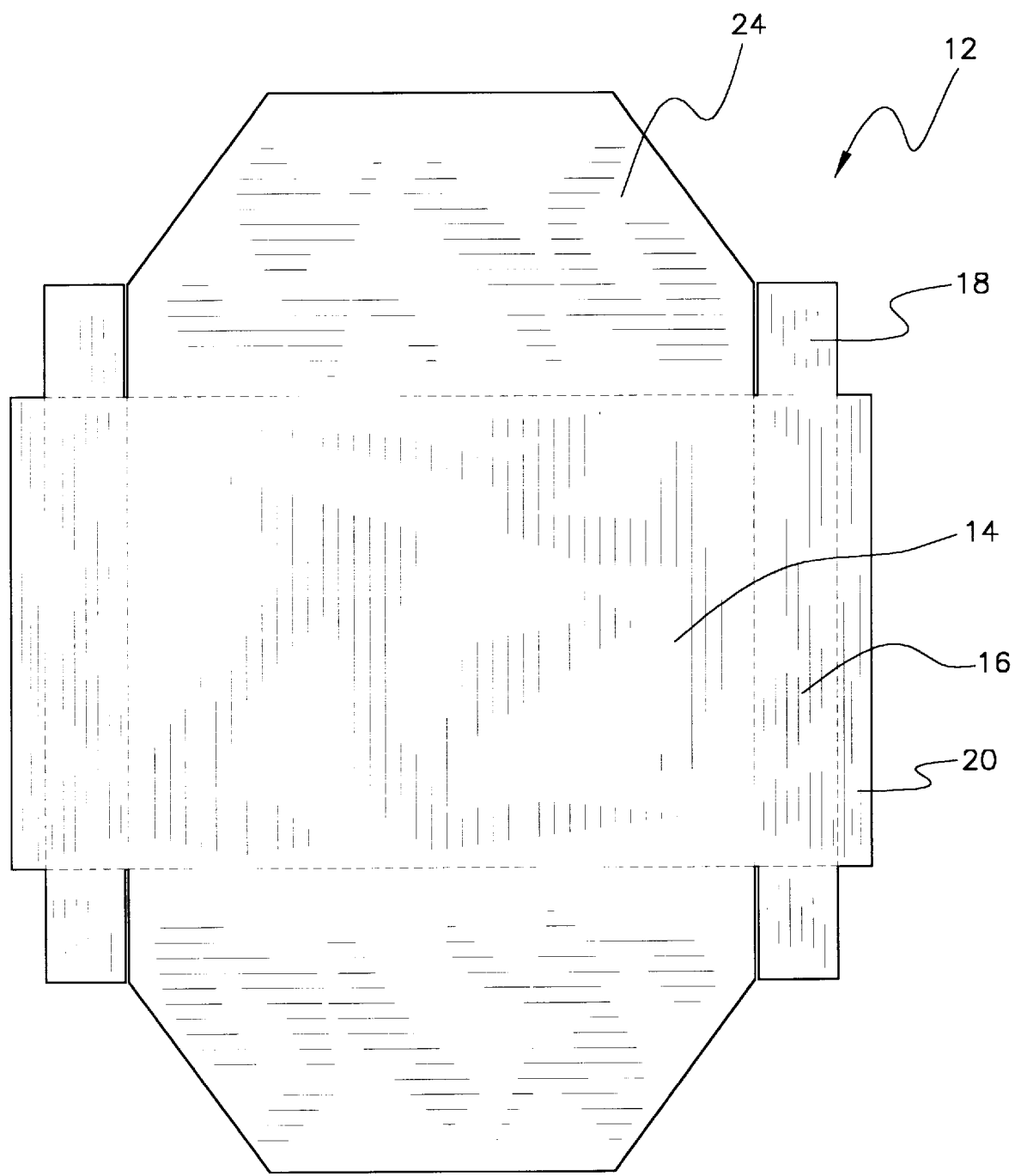
FIG. 4 is a top plan view of the top portion of the present invention.
Figure 5:
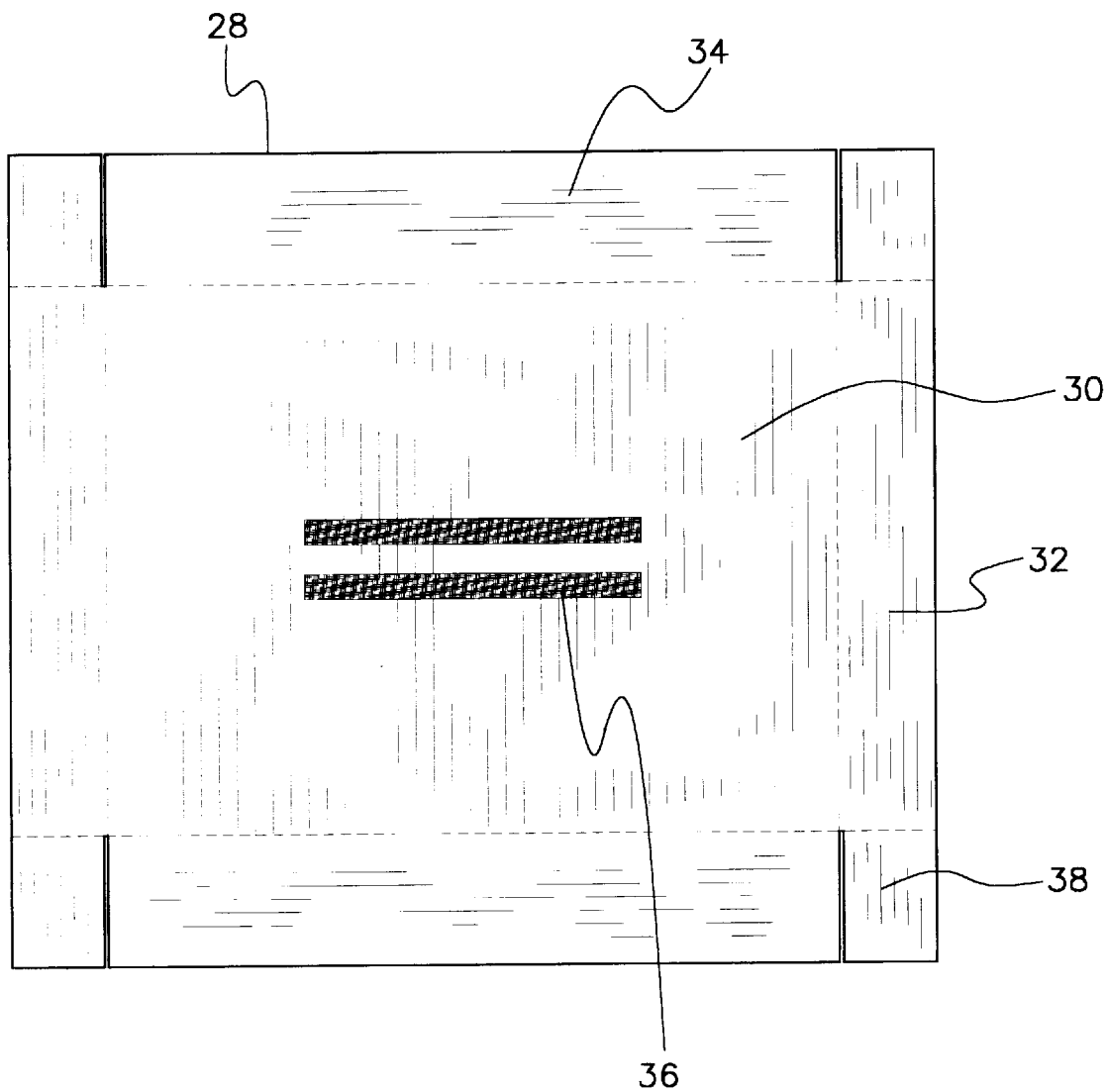
FIG. 5 is a bottom plan view of the bottom portion of the present invention.

With reference now to the drawings, and in particular to FIGS. 1 through 5 thereof, a new reusable gift wrapping container embodying the principles and concepts of the present invention and generally designated by the reference numeral 10 will be described.

As best illustrated in FIGS. 1 through 5, the reusable gift wrapping container 10 is designed to be wrapped around a container, such as a cardboard box. The reusable gift wrapping container 10 comprises a top portion 12 that has a generally rectangular central panel 14. The central panel 14 has opposed long side edges and opposed short end edges. Each of the opposed short end edges of the central panel has an end flap 16 that is foldably secured thereto.

Preferably, each of the end flaps 16 has a generally rectangular configuration. Each of the end flaps 16 has a pair of side flaps 18 foldably secured to opposed ends thereof. Also, supplemental end flaps 20 are foldably secured to opposite free outer edges of each of the end flaps.

Each of the opposed long side edges of the central panel 14 has a top flap 24 that is foldably secured thereto. Preferably, each of the top flaps 24 has a generally trapezoidal configuration. Each of the top flaps 24 has a hook and loop strip 26 disposed on a bottom surface thereof.

Preferably, the invention 10 further comprises a bottom portion 28 that has a generally rectangular bottom panel 30. The bottom panel 30 has a top and bottom, a pair of opposed ends and a pair of opposed sides. Each of the opposed ends of the bottom panel 30 has a pair of end flaps 32 that extend therefrom. Each of the opposed sides of the bottom panel 30 has a pair of bottom flaps 34 extending therefrom.

Preferably, each of the end flaps 32 of the bottom portion 28 has a pair of side flaps 38 that are foldably secured to opposed ends thereof. Also preferably, the bottom of the bottom panel 30 has a hooks and loop fastener 36 coupled thereto for coupling with the hook and loop strips 22 of the top flaps 24 of the top portion 12.

In use, the bottom flaps 34 and the end flaps 32 of the bottom portion 28 are folded perpendicular to the bottom panel 30 such that the bottom portion resembles an open-top box. Each of the side flaps 38 of the bottom portion 28 is coupled to a bottom flap 34. A gift or the like is placed in the on the bottom panel 30 of the bottom portion 28. The end flaps 16 of the top portion 12 are then folded up against the opposed end flaps 32 of the bottom portion 28. The supplemental end flaps 20 of the top portion 12 are then folded such that they abut the bottom panel 30 of the bottom portion 28. The side flaps 18 of the top portion 12 are then folded inwardly against the bottom flaps 34 of the bottom portion 28. The top flaps 24 of the top portion 12 are then folded around the bottom flaps 34 of the bottom portion 28 towards the bottom of the bottom panel 30 of the bottom portion 28 such that the hook and loop strips 26 of the top flaps 24 of the top portion 12 engage the hook and loop fastener 36 on the bottom of the bottom panel 30 of the bottom portion 28.

In another use, the bottom portion 28 is wrapped around a first container (not shown). The bottom flaps 34 and the end flaps 32 of the bottom portion are coupled to the sides of the first container. Each of the side flaps 38 of the bottom portion 28 are coupled to a bottom flap 34. The top portion 12 is wrapped around a second container (not shown). The end flaps 16 of the top portion 12 are coupled to sides of the second container. The supplemental end flaps 20 of the top portion 12 are coupled to the inside of corresponding sides of the second container. Each of the side flaps 18 of the top portion 12 are coupled to a side of the second container. A gift or the like is placed in the first container. The second container is placed over the first container. The top flaps 24 are wrapped towards the bottom of the bottom panel 30 of the bottom portion 28 such that the hook and loop strips 26 of the top flaps 24 of the top portion 12 engage the hook and loop fastener 36 on the bottom of the bottom panel 30 of the bottom portion 28.

Alternately, the device could incorporate a sound chip which would be activated when the top flaps are separated to expose the interior of the bottom portion and the gift disposed therein. When activated, the chip would play various songs for a predetermined time. The songs would vary for the specific occasion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new reusable gift wrapping container for providing an easier means of wrapping a gift comprising, in combination:

a top portion having a generally rectangular central panel, said central panel having opposed long side edges and opposed short end edges;

each of said opposed short end edges of said central panel having an end flap foldably secured thereto, said end flaps each having a generally rectangular configuration;

each of said end flaps having a pair of side flaps foldably secured to opposed ends thereof, each of said end flaps having a supplemental end flap foldably secured to a free outer edge thereof;

each of said opposed long side edges of said central panel having a top flap foldably secured thereto, each of said top flaps having a generally trapezoidal configuration, each of said top flaps having a hook and loop strip disposed on a bottom surface thereof;

a bottom portion having a generally rectangular bottom panel, said bottom panel having a top and bottom, a pair of opposed ends and a pair of opposed sides;

each of said opposed ends of said bottom panel having a pair of end flaps extending therefrom;

each of said end flaps having a pair of side flaps foldably secured to opposed ends thereof;

each of said opposed sides of said bottom panel having a pair of bottom flaps extending therefrom; and said bottom of said bottom portion having a pair of hook and loop fasteners coupled thereto for coupling with said hook and loop strips of said top flaps of said top portion.

2. The reusable gift wrapping container as set forth in claim 1, wherein each of said end flaps has a pair of side flaps foldably secured to opposed ends thereof.

3. The reusable gift wrapping container as set forth in claim 1, wherein said bottom portion is folded around a second container.

4. The reusable gift wrapping container as set forth in claim 3, wherein the second container is a cardboard box.

5. A new reusable gift wrapping container for providing an easier means of wrapping a gift comprising, in combination:

a top portion having a central panel, said central panel having opposed long side edges and opposed short end edges;

each of said opposed short end edges of said central panel having an end flap foldably secured thereto;

each of said opposed long side edges of said central panel having a top flap foldably secured thereto;

a bottom portion having a generally rectangular bottom panel, said bottom panel having a top and bottom, a pair of opposed ends and a pair of opposed sides, each of said opposed ends of said bottom panel having a pair of end flaps extending therefrom, each of said opposed sides of said bottom panel having a pair of bottom flaps extending therefrom; and each of said top flaps having a hook and loop strip disposed on a bottom surface thereof, said bottom of said bottom portion having a pair of hook and loop fasteners coupled thereto for coupling with said hook and loop strips of said top flaps of said top portion.

6. The reusable gift wrapping container as set forth in claim 5, wherein said end flaps of said central panel of said top portion each have a generally rectangular configuration, said end flaps each having a pair of side flaps foldably secured to opposed ends thereof.

7. The reusable gift wrapping container as set forth in claim 6, wherein said end flaps each have a supplemental end flap foldably secured to a free outer edge thereof.

8. The reusable gift wrapping container as set forth in claim 5, wherein each of said top flaps have a generally trapezoidal configuration.

* * * * *